United States Patent Office 3,440,115
Patented Apr. 22, 1969

3,440,115
SHOCK-GEL PROCESS FOR PREPARING
PLASTIC-BONDED EXPLOSIVES
Charles W. Falterman and Horace D. Stanton, China
Lake, Calif., assignors to the United States of America
as represented by the Secretary of the Navy
No Drawing. Filed Nov. 9, 1964, Ser. No. 410,030
Int. Cl. C06b 21/00, 15/02
U.S. Cl. 149—4                 5 Claims The invention described herein may be manufactured and used by or for the Government of the United States of America for governmental purposes without the payment of any royalties thereon or therefor.

The present invention relates generally to improvements in ordnance mixing processes and more particularly to an improved process for preparing an acceptable molding powder of plastic-bonded explosives.

Those concerned with the development of ordnance molding powder of the types which are, in practice, isostatically or mechanically compressed under high pressures into plastic-bonded explosive billets, propellant grains, and the like, have long been aware of the requirements that the individual powder granules must be of a predetermined substantially uniform size having uniform coatings of plastic bonding material to achieve uniform composition as well as an absence of fine uncoated particles so that "dusting" of the powder can be kept to a minimum. The method normally employed for preparing ordnance molding powder is typified by the slurry process for preparing PBX (Plastic Bonded Explosive) molding powder. Such a process usually comprises a technique wherein crystals of an explosive such as RDX (cyclotrimethylenetrinitramine), or HMX (cyclotetramethylenetetranitramine) and aluminum are placed in a slurry kettle along with selected quantities of methanol and water. Then the bonding material or plastic such as nylon, or Viton A, which has been dissolved in a suitable solvent and referred to as the lacquer, is added. The thus formed slurry is stirred under ambient conditions, i.e., room temperature and atmospheric pressure, until most of the large agglomerates of the crystalline ingredients have been broken down. After the initial mixing period, usually 30 minutes to one hour, the kettle is heated to 180° F. and mixing is continued under heat and reduced pressure for several hours in order to cause the plastic to precipitate and adhere to the solid materials (explosive crystals and aluminum particles) leaving a sediment of plastic-coated granules. This method has not been found to be entirely satisfactory in that it is expensive where large quantities of explosives are to be prepared, since it involves the use of high temperatures, long processing times and the use of complex vacuumizing devices. More importantly, the thus formed powder, in the case of certain PBX's, does not satisfy existing needs as it comprises some large agglomerates and also some very fine granules which are nonuniformly coated with the plastic bonding material. These defects lead to an undesirable end product which is likely to have low physical strength in the non-coated areas and variable detonation characteristics because of non-uniform density. Furthermore, the thus formed powder is subject to "dusting," a characteristic which inherently precludes a handling thereof in large quantities and thereby renders it unacceptable for use in mass production facilities.

The purpose of this invention is to provide a simple, efficient, and expeditious method for preparing plastic-bonded ordnance molding powder, wherein the granule size and the plastic coating therefor may be controlled, and whereby PBX molding powder can be compressed therefrom for safety and efficiently mass-producing explosive billets, propellant grains, and the like having uniform density characteristics.

An object of the invention is to provide an improved method for providing ordnance molding powder granules of a substantially uniform and predetermined size and which also possess substantially uniform coatings of the selected plastic bonding composition.

A further objective is to provide a simple, efficient method for uniformly coating RDX crystals and aluminum particles to yield uniform granules of predetermined size, referred to as a PBX molding powder, which may be safely and efficiently handled and utilized in the formation of compressed charges having uniform density and compressive strength characteristics.

Yet another object is to provide an improvement in methods for providing ordnance plastic bonding molding powder.

Other objects, advantages and novel features of the invention will become apparent from the following detailed description thereof.

Briefly, the invention contemplates coating crystals of ordnance compounds with a plastic binder while they are in a uniformly distributed and suspended state. This is achieved by mixing the crystals of ordnance materials with a lacquer of nylon dissolved in methanol to provide a mixture, hereinafter referred to as mud. The mud is stirred to eliminate all agglomerates of the ordnance composition and to provide a thoroughly mixed mass wherein the crystals of the explosive and the dissolved plastic are uniformly dispersed throughout the resulting medium. An initial quantity of a selected precipitating agent or solution is rapidly added to the thus formed mass and stirred or agitated in order that precipitation of the plastic may be uniformly initiated throughout the mass. For the preparation of molding powder with relatively large amounts of binder such as 14% nylon PBXN–3, the initial quantity of precipitating solution is such that it is insufficient for effecting more than an initial preciptaton. Consequently, a substanal quantity of plastic remains in solution. After the initial quantity of precipitating solution has been dispersed throughout the mix, but before substantial sedimentation results, a second quantity of precipitating agent or solution is rapidly added to the mix, while the mass is being stirred. Qualitatively, during this process it appears that the second quantity of fluid serves to further initiate precipitation, whereby small suspended granules of coated srystals are formed. These granules are initially very small, but tend to grow rapidly by engaging and adhering to adjacent granules. After a few seconds, the granules attain an aptimum size, whereupon granule growth may now be arrested by "flooding" or rapidly introducing an excess of the precipitating fluid and rapidly agitating the mixture. If this "flooding" is omitted, so that granule growth remains unrestricted, the individual granules become much too large for most practical purposes. Consequently, it is feasible as well as desirable to "flood" at a selected point in the process in order to arrest granule growth and provide a powder of granules having uniform and predetermined sizes. After flooding, the sediment is washed, dried and subsequently screened to provide an ordnance powder acceptable for purposes of mass-handling and isostatic or mechanical compression, whereby the plastic of the coating may be utilized to "weld" the crystals into a homogeneous mass of uniform density.

The method hereinbefore generally set forth may be used in forming plastic-bonding molding powder of various types, however, it is particularly useful in providing large quantities of acceptable ordnance molding powder of the compositions known as PBXN–2 and PBXN–3.

PBXN–2 is a plastic-bonded explosive composition of 5.5% nylon, and 94.5% HMX of 15-to-25-micron median particle diameter. In the preparation of this plastic-bonded molding powder a lacquer was prepared by dissolving 4.1 pounds of nylon (Zytel 63) in 9.3 gallons of methanol. Zytel 63 comprises synthetic linear polycarbonamide having a melting point of about 300 to 320° F. Particularly suitable polycarbonamides are the interpolymers obtained by polymerizing a plurality of polymide-forming ingredients as described in U.S. Patents Nos. 2,252,555 and 2,252,557. A closed, but not sealed, container was used in the step of dissolving the nylon for preparing the lacquer so that evaporation of the methanol was minimized. In order to increase the rate of solution of the nylon, the contents of the container were stirred and maintained at a temperature of 130° F. When it appeared as though the nylon had been completely dissolved, the lacquer was poured through a cheesecloth in order to remove any undissolved particles.

A quantity, 69.5 pounds (dry basis) of water-wet HMX, 15-to-25-micron median diameter, was placed in a 30-gallon mixing kettle and mixed with three gallons of methanol. This was stirred until it appeared that the majority of the HMX agglomerates had been eliminated. The nylon lacquer was then added to form the mud and the resulting mixture mechanically agitated, at approximately 60 r.p.m. (revolutions per minute), until the HMX appeared to be completely dispersed. To the kettle there was next added a precipitating solution comprising 20.6 pounds of one-percent aqueous sodium nitrate solution. The sodium nitrate was added to the precipitating agent for preventing loss of nylon, but may be eliminated where desired. The resulting mixture was gently agitated for 10 seconds. Forty-one and two-tenths pounds of the sodium nitrate precipitating solution was then added and the contents of the kettle again agitated for 10 seconds. Another 41.2 pounds of the precipitating solution was added, followed by another 10-second mixing of the contents. The coated HMX particles was then allowed to settle. The resulting sediment was then washed twice with 123-pound portions of water.

After final washing with water, the water was decanted from the resulting molding powder. The powder was poured on a 3-foot diameter, Nutsch-type vacuum filter and dried by suction until its moisture content was reduced to approximately 20-to-30-percent, whereupon the powder was screened through a 4-mesh screen, placed in layers in drying trays, with the layers of powder being from one-to-two inches in depth, and oven-dried at 80° C. for 20 hours.

Several batches of molding powder were thus prepared. In some batches, the nylon content was one-percent low, due to weighing errors. In other batches, the nylon content ranged between 5.2 and 5.8%. This variance could have been substantially decreased by using dry rather than water-wet HMX.

The molding powder from all batches had bulk densities in the region of 0.5 to 0.6 g./cc. (grams per cubic centimeters) and had particle-size distributions such that approximately 50% of the powder went through a 20-mesh screen. Tests performed on pellets, prepared from the resulting powder, indicated a density of approimately 98% theoretical maximum density and compressive strengths greater than 10,000 p.s.i. (pounds per square inch).

PBXN-3 is a plastic-bonded explosive composition of 14% nylon, Zytel 63, and 86% HMX of 20–40 micron median particle diameter. Molding powder of PBXN-3 may be formed in much the same manner as that used to provide molding powder of PBXN-2. In processing powder of PBXN-3, the nylon was dissolved in methanol to form a lacquer and added to the HMX. The resulting mixture was heated to approximately 115° F. and a quantity of water, equal in volume to about the volume of the methanol, was added rapidly to the mixture or mud as it was stirred at about 275 r.p.m. for initiating precipitation and thus causing the nylon and HMX to form soft curds. After a short mixing period, another quantity of water, slightly more than one-half the amount of the first addition, was added and stirring was continued at about 275 r.p.m. This caused the soft curds to shrink into small granules which began settling. The small granules then grew in size, by sticking or adhering to each other. Large quantities of cold water were then added to the kettle, which reduced the temperature of the contents and arrested granule growth. The granules were allowed to settle and the resulting sediment was then washed and dried to provide a molding powder formed of granules having a bulk density of 0.80 to 0.90 g./cm.$^3$.

The following chart serves to illustrate variations in particle size and bulk densities obtainable when utilizing the foregoing process:

| Batch No. | Ingredients in mud, lb. | | | | Temp., F. | First addition of H$_2$O | | |
|---|---|---|---|---|---|---|---|---|
| | HMX | Nylon | MeOH | H$_2$O | | Amt., lb. | Rate, r.p.m. | Time, min. |
| 1 | 47.2 | 8.0 | 56.0 | 0 | 115 | 50 | 275 | 1/4 |
| 2 | 47.0 | 7.8 | 56.0 | 0 | 115 | 51 | 275 | 1/4 |
| 3 | 35.1 | 6.0 | 44.6 | 9.9 | 111 | 31.2 | 275 | 1/6 |
| 4 | 37.0 | 6.44 | 52.3 | 0 | 120 | 128 | 250 | |

| Batch No. | Condition of mix | Second addition of H$_2$O | | Comment | Properties, final powder size, percent | | Bulk density, g./cm.$^3$ |
|---|---|---|---|---|---|---|---|
| | | Amt., lb. | Rate, r.p.m. | | Through #4 mesh | On #40 mesh | |
| 1 | Soft curds | 34 | 275 | Excess H$_2$O added to set granules. | 90 | 89 | 0.87 |
| 2 | do | 33 | 275 | | 91 | 90 | 0.83 |
| 3 | do | 26 | 250 | | 95 | 95 | 0.84 |
| 4 | Completely precipitated into fine granules. | | | | 93 | 50 | 0.60 |

Referring to the chart, it is to be noted that a single addition of water in quantities sufficient to cause the nylon to completely precipitate, batch No. 4, will result in fine granules of low bulk density. In many instances, powder formed of these particles will be found to be unsuitable, because of its susceptibility to "dusting."

The foregoing process has also been successfully utilized to produce PBXN-1 (a composition of RDX, aluminum and nylon). The process included mixing 136 grams of RDX, 40 grams of aluminum and 24 grams of nylon dissolved in 200 cc. of methanol. The mixture was stirred at 200 r.p.m. for thirty-minutes in order to eliminate RDX agglomerates. A selected quantity of ambient water was rapidly added and stirred to cause precipitation of the nylon to occur for forming small granules, which were then washed and dried. The percentage of theoretical density of pellets pressed from this powder varied downwardly from 98.88% to 97.97% as the quantity of water was increased from 800 cc. to 2000 cc. However, it was found that the average spread in the percentage of theoretical density attained (an indication of the homogeniety of the powder) became smaller as quantities of water greater than 1000 cc. were added to the mix.

It is to be understood that the process of the instant invention can be used in processing powder from ordnance compositions of various types and having varying characteristics. For example, other plastics, such as Viton, have been used as well as other and numerous solid ingredients. The precipitating or quenching agents may be varied, for example, toluene has been successfully utilized. Also, propellant grains have been successfully formed from powder obtained through a utilization of the method of the present invention.

Therefore, it is to be understood that the present invention affords a simple and economic method of producing uniformly plastic-coated granules of ordnance compositions, wherein the size and density of the resulting granules may be controlled to provide an ordnance molding powder which may be utilized in mass-production facilities for producing compressed plastic-bonded ordnance items.

Obviously many modifications and variations of the present invention are possible in the light of the above teachings. It is therefore to be understood that within the scope of the appended claims the invention may be practiced otherwise than as specifically described.

What is claimed is:
1. In a method of mixing an ordnance molding powder, wherein individual particles of an ordnance compositions are coated with a plastic binder material, the steps comprising:
  mixing a mud comprising particles selected from the group consisting of HMX, RDX, aluminum, and mixtures thereof, and a lacquer comprising an admixture of a plastic selected from the group consisting of a linear polycarbonamide, an interpolymer obtained by polymerizing a plurality of polyamide-forming ingredients, and a copolymer of vinylidene and perfluoropropylene and a compatible solvent;
  mixing said mud until particles and plastic are uniformly distributed and suspended, throughout;
  rapidly adding a first aqueous precipitating solution at least equal to the volume of said solvent while agitating the mud to initiate a uniform precipitation of the plastic from the lacquer onto said particles while they are suspended in said mud;
  adding a second quantity of said precipitating solution of about one-half the volume of said solvent to draw off remaining solvent and to cause a formation of granules;
  adding an excess volume of said precipitating solution at room temperature, to set the size of the granules;
  allowing said granules to settle to form a sediment;
  decanting and washing the thus formed sediment in water; and drying the washed sediment to provide a molding powder of granules having a substantially uniform size and bulk density.

2. The method according to claim 1 being further characterized in that said ordnance compound comprises a mixture of 69.5 pounds (dry basis) of water-wet HMX, three gallons of methanol mixed sufficiently for all agglomerates of HMX to be broken up, and said lacquer comprises 4.1 pounds of nylon dissolved in 9.3 gallons of methanol, said first volume of precipitating solution comprises 41.2 punds of one-percent sodium nitrate solution, the second volume of precipitating solution comprises 20.6 pounds of one-percent sodium nitrate solution, and the third volume of precipitating solution comprises 41.2 pounds of one-percent sodium nitrate solution.

3. The method as defined in claim 1 being further characterized in that said mud is heated to 115° F. and comprises 47.2 pounds (dry basis) HMX, said plastic binder comprises eight pounds of nylon, said methanol comprises 56 pounds of methanol, and the first volume of precipitating solution comprises 50 pounds of water at room temperature, the second volume of precipitating solution comprises 34 pounds of water at room temperature, and the third volume of precipitating solution comprises a sufficient quantity of water, at room temperature, to wash the granules.

4. A method of providing plastic-bonded explosive molding powder, comprising the steps of:
  providing a one-gallon slurry kettle;
  adding to said kettle 136 grams of RDX, 40 grams of aluminum and 24 grams of a plastic dissolved in 200 cubic-centimeters of methanol;
  stirring the mixture for a period sufficient for eliminating all agglomerates of RDX;
  rapidly adding 800 to 2000 cubic-centimeters of ambient water within 15 seconds;
  allowing granules of plastic-coated aluminum and RDX to settle;
  decanting the fluid from the thus obtained mix;
  washing the settled granules; and
  drying the granules to provide a powder of plastic-coated granules.

5. In a method of coating particles of ordnance molding powder wherein given quantities of molding powder particles, methanol, and plastic binder material are mixed to provide a mixture preparatory to coating the particles with the plastic binder material, the improvement comprising the steps of:
  agitating the mixture and rapidly adding to said mixture a quantity of aqueous precipitating solution to initiate a precipitation of the plastic binder and a coating of the particles with said plastic binder, while said particles are suspended and distributed uniformly throughout said mixture; and
  agitating the thus obtained mixture; and
  adding succeeding quantities of aqueous precipitating solutions to set the size of the resulting plastic-coated granules to provide a powder comprising uniform granules.

References Cited

UNITED STATES PATENTS

| | | | |
|---|---|---|---|
| 2,230,100 | 1/1941 | Aaron et al. | 264—3 |
| 3,138,501 | 6/1964 | Wright | 149—92 |
| 3,166,612 | 1/1965 | Sauer et al. | 264—3 |
| 3,173,817 | 3/1965 | Wright | 149—2 |
| 3,266,957 | 8/1966 | Stresan | 149—11 |

BENJAMIN R. PADGETT, *Primary Examiner.*

MICHAEL J. McGREAL, *Assistant Examiner.*

U.S. Cl. X.R.
149—6, 92